United States Patent
Kveton et al.

(10) Patent No.: US 10,984,058 B2
(45) Date of Patent: Apr. 20, 2021

(54) ONLINE DIVERSE SET GENERATION FROM PARTIAL-CLICK FEEDBACK

(71) Applicant: Adobe Inc., San Jose, CA (US)

(72) Inventors: Branislav Kveton, San Jose, CA (US); Zheng Wen, Fremont, CA (US); Prakhar Gupta, Bengaluru (IN); Iftikhar Ahamath Burhanuddin, Bangalore (IN); Harvineet Singh, Bengaluru (IN); Gaurush Hiranandani, Urbana, IL (US)

(73) Assignee: ADOBE INC., San Jose, CA (US)

( * ) Notice: Subject to any disclaimer, the term of this patent is extended or adjusted under 35 U.S.C. 154(b) by 537 days.

(21) Appl. No.: 15/892,085

(22) Filed: Feb. 8, 2018

(65) Prior Publication Data

US 2019/0243923 A1    Aug. 8, 2019

(51) Int. Cl.
*G06F 16/00*    (2019.01)
*G06F 16/9535*    (2019.01)
(Continued)

(52) U.S. Cl.
CPC ........ *G06F 16/9535* (2019.01); *G06F 16/248* (2019.01); *G06F 16/24578* (2019.01); *G06N 20/00* (2019.01); *G06Q 30/02* (2013.01)

(58) Field of Classification Search
CPC ............. G06F 16/24578; G06F 16/248; G06F 16/9535; G06N 20/00; G06Q 30/02
See application file for complete search history.

(56) References Cited

U.S. PATENT DOCUMENTS

| | | | |
|---|---|---|---|
| 2012/0016642 A1* | 1/2012 | Li | G06Q 30/02 703/2 |
| 2016/0086086 A1* | 3/2016 | Gabillon | G06F 16/2457 706/11 |

(Continued)

OTHER PUBLICATIONS

Adomavicius, Gediminas, et al., "Improving Aggregate Recommendation Diversity Using Ranking-Based Techniques," IEEE Transactions On Knowledge And Data Engineering vol. 24 No. 5, 2012, 15 pages.

(Continued)

*Primary Examiner* — Diedra McQuitery
(74) *Attorney, Agent, or Firm* — F. Chau & Associates, LLC

(57) ABSTRACT

A machine-learning framework uses partial-click feedback to generate an optimal diverse set of items. An example method includes estimating a preference vector for a user based on diverse cascade statistics for the user, the diverse cascade statistics including previously observed responses and previously observed topic gains. The method also includes generating an ordered set of items from the item repository, the items in the ordered set having highest topic gain weighted by similarity with the preference vector, providing the ordered set for presentation to the user, and receiving feedback from the user on the ordered set. The method also includes, responsive to the feedback indicating a selected item, updating the diverse cascade statistics for observed items, wherein the updating results in penalizing the topic gain for items of the observed items that are not the selected item and promoting the topic gain for the selected item.

20 Claims, 8 Drawing Sheets

(51) Int. Cl.
*G06N 20/00* (2019.01)
*G06F 16/248* (2019.01)
*G06F 16/2457* (2019.01)
*G06Q 30/02* (2012.01)

(56) References Cited

U.S. PATENT DOCUMENTS

| | | | | |
|---|---|---|---|---|
| 2017/0098236 | A1* | 4/2017 | Lee | G06Q 30/0244 |
| 2018/0084111 | A1* | 3/2018 | Pirat | H04L 51/04 |
| 2018/0225589 | A1* | 8/2018 | Ghavamzadeh | G06Q 30/0241 |
| 2019/0073363 | A1* | 3/2019 | Perez | G06F 16/335 |
| 2019/0179938 | A1* | 6/2019 | Feuz | G06F 9/542 |

OTHER PUBLICATIONS

Agichtein, Eugene, et al., "Improving Web Search Ranking by Incorporating User Behavior Information," Proceedings of 29th Annual International ACM SIGIR Conference on Research and Development in Information Retrieval, 2006, 8 pages.

Carbonell, Jaime G., et al., "The Use of MMR and Diversity-Based Reranking for Reodering Documents and Producing Summaries," Proceedings of the 21st meeting of International ACM SIGIR Conference, Aug. 1998, pp. 335-336.

Chuklin, Aleksandr, et al., "Click Models for Web Search," available online at <http://www.morganclaypool.com/doi/abs/10.2200/S00654ED1V01Y201507ICR043>, 2015, 99 pages.

Craswell, Nick, et al., "An Experimental Comparison of Click Position-Bias Models," Proceedings of International Conference on Web Search and Data Mining, Feb. 11-12, 2008, 9 pages.

Kveton, Branislav, et al., "Cascading Bandits: Learning to Rank in the Cascade Model", Proceedings of 32nd International Conference on Machine Learning, 2015, 10 pages.

Kveton, Branislav, et al., "Combinatorial Cascading Bandits," Proceedings of 28th International Conference on Neural Information Processing Systems, vol. 1, 2015, 9 pages.

Li, Shuai, et al., "Contextual Combinatorial Cascading Bandits," Proceedings of 33rd International Conference on Machine Learning, 2016, 9 pages.

Li, Lihong, et al., "Unbiased Offline Evaluation of Contextual-bandit-based News Article Recommendation Algorithms," Proceedings of 4th ACM International Conference on Web Search and Data Mining, Feb. 2011, 10 pages.

Mei, Qiaozhu, et al., "DivRank: the Interplay of Prestige and Diversity in Information Networks," Proceedings of 16th ACM SIGKDD International Conference on Knowledge Discovery and Data Mining, Jul. 2010, pp. 1009-1018.

Radlinski, Filip, et al., "Learning Diverse Rankings with Multi-Armed Bandits," Proceedings of 25th International Conference on Machine Learning, 2008, 8 pages.

Ricci, Francesco, et al., "Recommender Systems Handbook," available online at <http://www.cs.ubbcluj.ro/~gabis/DocDiplome/SistemeDeRecomandare/Recommender_systems_handbook.pdf>, 2011, 59 pages.

Yue, Yisong, et al., "Linear Submodular Bandits and their Application to Diversified Retrieval," NIPS, 2011, 9 pages.

Zong, Shi, et al., "Cascading Bandits for Large-Scale Recommendation Problems," Proceedings of the Thirty-Second Conference on Uncertainty in Artificial Intelligence, Jun. 30, 2016, 15 pages.

Abbasi-Yadkori, Y, et al., "Improved Algorithms for Linear Stochastic Bandits", In Advances in Neural Information Processing Systems 24, 2011, pp. 2312-2320.

Combes, R, et al., "Learning to Rank: Regret Lower Bounds and Efficient Algorithms", In Proceedings of the 2015 ACM SIGMETRICS International Conference on Measurement and Modeling of Computer Systems, Jun. 2015, 14 pages.

El-Arini, Khalid, et al., "Turning Down the Noise in the Blogosphere", In Proceedings of the 15th ACM SIGKDD International Conference on Knowledge Discovery and Data Mining, 2009, 9 pages.

Katariya, Sumeet, et al., "DCM Bandits: Learning to Rank with Multiple Clicks", In Proceedings of the 33rd International Conference on Machine Learning, 2016, 10 pages.

Krause, Andreas, et al., "Submodular Function Maximization", Tractability: Practical Approaches to Hard Problems 3(19):8, 2012, 28 pages.

Liu, Tie-Yan, "Learning to Rank for Information Retrieval", Foundations and Trends in Information Retrieval, 2009, vol. 3, No. 3, 36 pages.

Radlinski, Filip, et al., "Redundancy, Diversity and Interdependent Document Relevance", In ACM SIGIR Forum, vol. 43 No. 2, Dec. 2009, pp. 46-52.

Slivkins, Aleksandrs, et al., "Ranked Bandits in Metric Spaces: Learning Diverse Rankings over Large Document Collections", Journal of Machine Learning Research 14, Jan. 2013, pp. 399-436.

Wen, Zheng, et al., "Efficient Learning in Large-Scale Combinatorial Semi-Bandits", International Conference on Machine Learning, 2015, JMLR, vol. 37, 10 pages.

* cited by examiner

1: Inputs: Tunable parameters $\sigma > 0$ and $\alpha > 0$
2:
3: // Initialization
4: $M_0 \leftarrow I_d, \quad B_0 \leftarrow 0$
5:
6: for $t = 1, \ldots, n$ dp
7:    // Regression estimate of $\Theta^*$
8:    $\bar{\Theta}_{t-1} \leftarrow \sigma^{-2} M_{t-1}^{-1} B_{t-1}$
9:
10:    // Recommend a list of $K$ items and get feedback
11:    $S \leftarrow 0$
12:    for $k = 1, \ldots, K$ do
13:      for all $e \in E \setminus S$ do
14:        $x_e \leftarrow \Delta(e \mid S)$
15:      $a_k^t \leftarrow \arg\max [\, x_e^T \ddot{\Theta}_{t-1} + \alpha \sqrt{x_e^T M_{t-1}^{-1} x_e}\,]$
16:      $S \leftarrow S \cup \{a_k^t\}$
17:    $A_t \leftarrow (a_1^t, \ldots, a_K^t)$
18:    Observe click $C_t \in \{1, \ldots, K, \infty\}$
19:
20:    // Update statistics
21:    $M_t \leftarrow M_{t-1}, \quad B_t \leftarrow B_{t-1}$
22:    for $k = 1, \ldots, \min\{C_t, K\}$ do
23:      $x_e \leftarrow \Delta(a_k^t \mid \{a_1^t, \ldots, a_{k-1}^t\})$
24:      $M_t \leftarrow M_t + \sigma^{-2} x_e x_e^T$
25:      $B_t \leftarrow B_t + x_e \mathbf{1}\{C_t = k\}$

FIG. 4

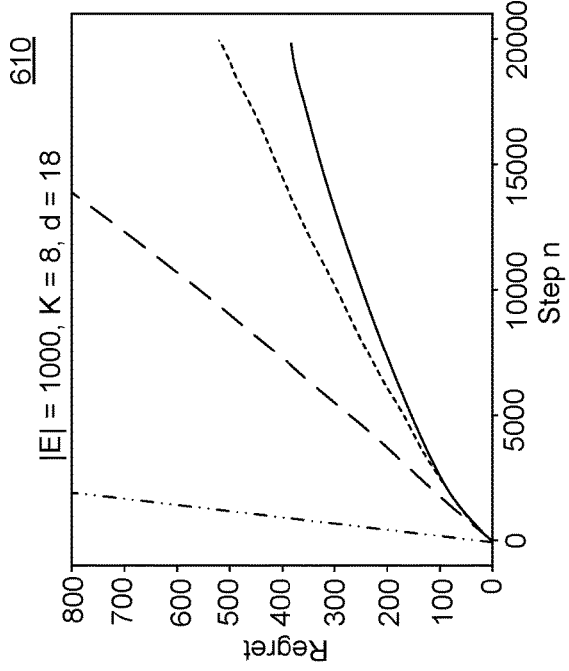
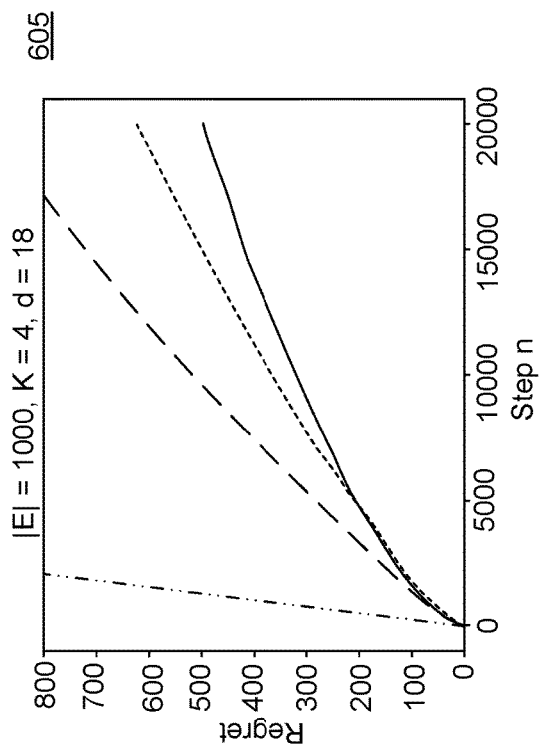
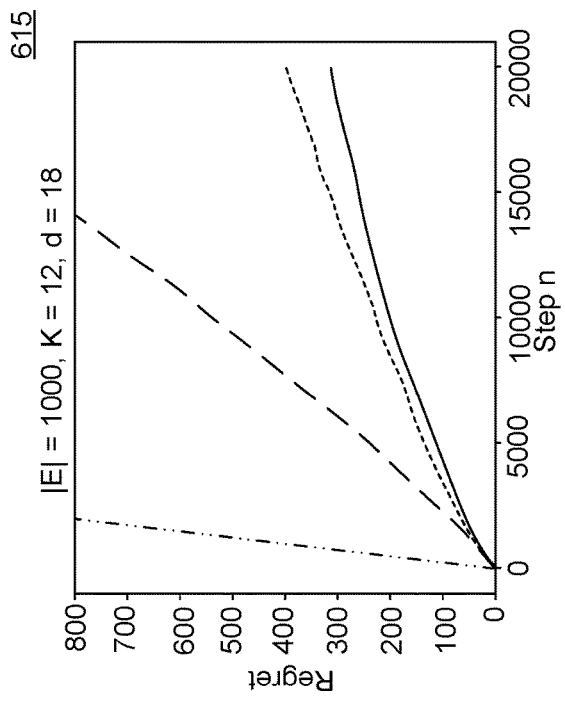
FIG. 6

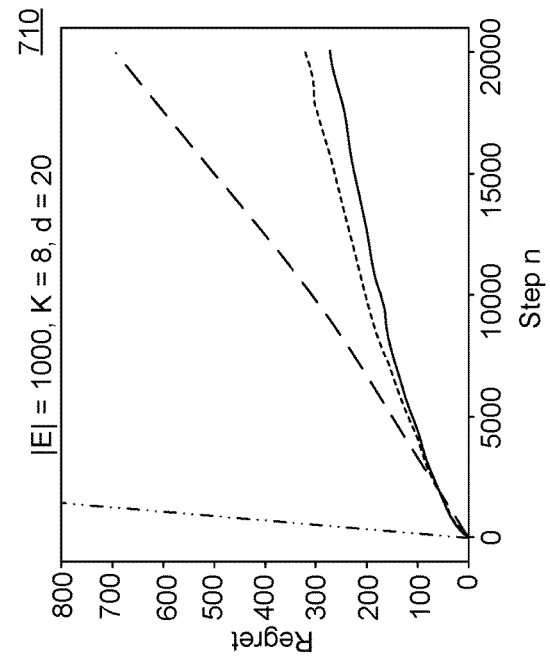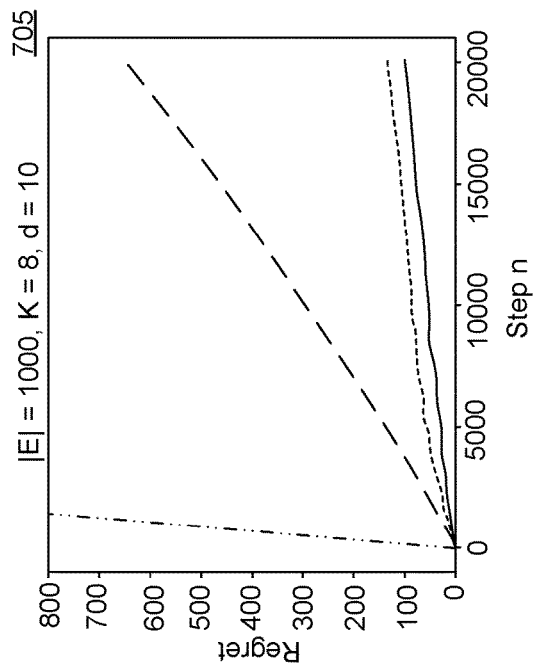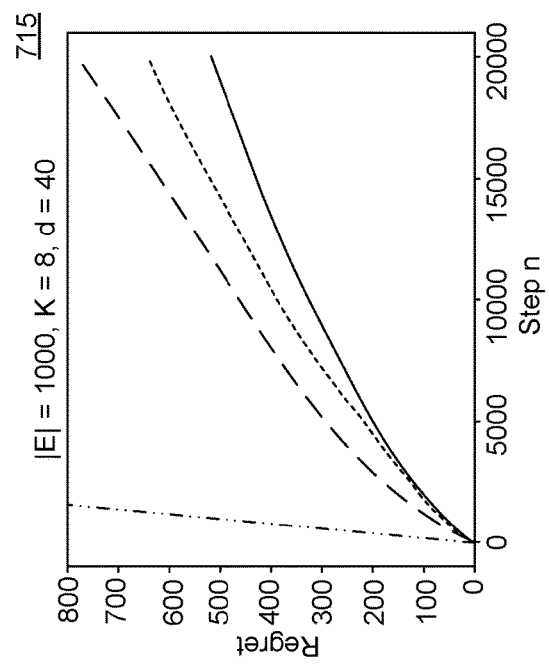
FIG. 7

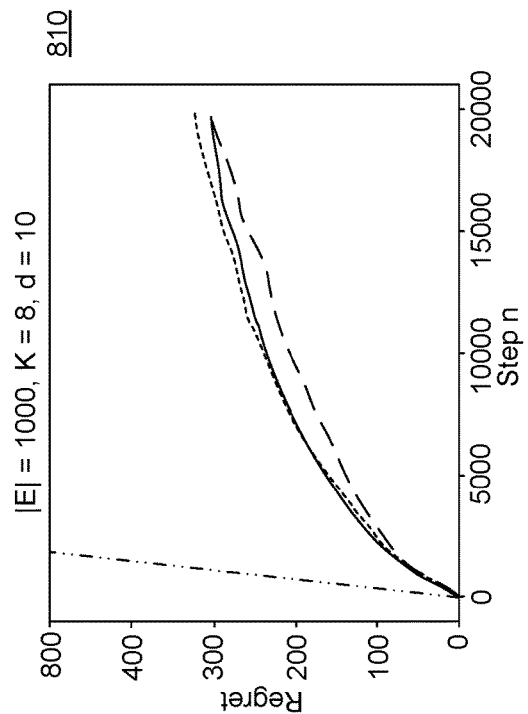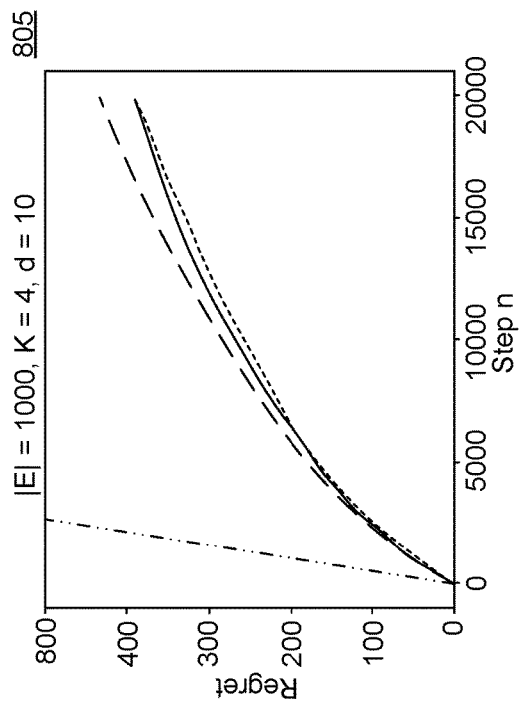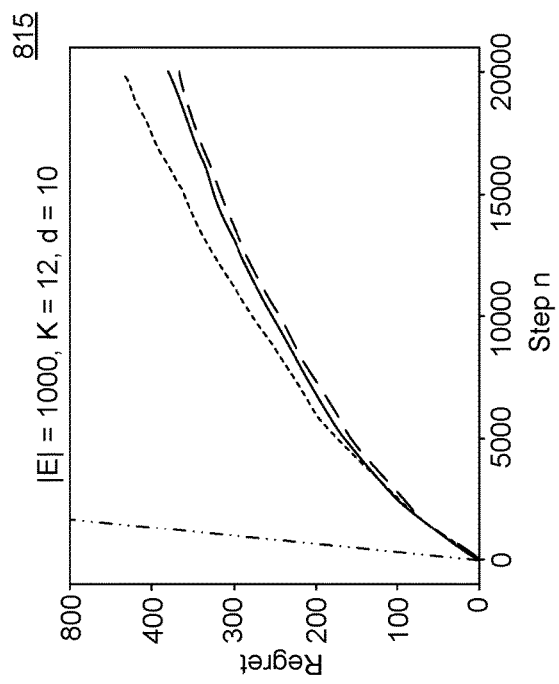
FIG. 8

ONLINE DIVERSE SET GENERATION FROM PARTIAL-CLICK FEEDBACK

TECHNICAL FIELD

This description relates to machine-learning used to generate a diverse set of items based on partial-click feedback. More specifically, the description relates to a partial-click feedback model used to learn preferences for a user, the preferences being used to generate an optimal set of recommended items to the user. The optimal set includes items representing the various learned preferences of the user.

BACKGROUND

Learning to rank is an important problem in machine learning, especially for machine learning based recommendation systems. Such systems aim to select items most relevant to a particular user. Recommendation systems conventionally provide multiple items for the user to review. The goal of some recommendation systems is to select the items most attractive to the user, i.e., items that the user is more likely to select. One way for machine learning recommendation systems to improve the list of items is through user feedback, e.g., selections made by the user. Such models are also referred to as click models. A click model is a stochastic model of how the user interacts with a list of items. Put another way, such models describe a process by which the user examines and clicks, i.e., selects, items in the list. Over time, the click model helps the recommendation system identify characteristics of items the user finds appealing so that future recommendations include more of these items.

SUMMARY

Implementations include a recommendation system with a partial-click feedback model that learns to provide a diverse but highly relevant set of items for presentation to the user. The partial-click feedback model accounts for both the diversity of items within an item repository and positional bias. Positional bias occurs because lower ranked items are less likely to be selected by the user due to their position and not necessarily because of a lack of interest by the user, i.e. because the user is not attracted to the item. Diversity represents different characteristics of the items that a user may find appealing. For ease of explanation, these characteristics are referred to as topics, but topics are understood to refer to any criteria that can be used for categorization. The items in an item repository may be associated with one or more topics and the user may have an interest in one or more of the topics. Because user interests are typically varied a user is more likely to find something in a diverse set of items attractive. Conventional click models that account for positional bias, sometimes referred to as cascade models, do not guarantee diversity. This may lead to the recommendation system providing low-dimensional lists, e.g., lists that represent only one or may be two topics of interest to the user. Such low dimensional lists are not optimal, as the user may be interested in action movies today and a comedy tomorrow. Conventional models that guarantee diversity fail to account for positional bias. This may lead to failure of the system to converge on an optimal solution regardless of the number of interactions the user has with the recommendation system, meaning the recommendation system is never guaranteed to provide an optimal list. Disclosed implementations include a machine learning recommendation system that accounts for both diversity and positional bias and converges on an optimal solution with fewer processing cycles. Accordingly, disclosed recommendation systems learn to produce higher quality lists with fewer interactions with the user. This leads to more accurate systems that result in higher user satisfaction with fewer computing resources. Models consistent with disclosed implementations are referred to as diverse cascade models.

The details of one or more implementations are set forth in the accompanying drawings and the description below. Other features will be apparent from the description and drawings, and from the claims.

BRIEF DESCRIPTION OF THE DRAWINGS

FIG. 4 is an example of pseudocode illustrating a process that uses a diverse cascade model for providing optimal recommendations, according to an implementation.

FIGS. 5-8 are graphs illustrating the benefits of a diverse cascade model over conventional models in varying environments.

DETAILED DESCRIPTION

Figure 1:
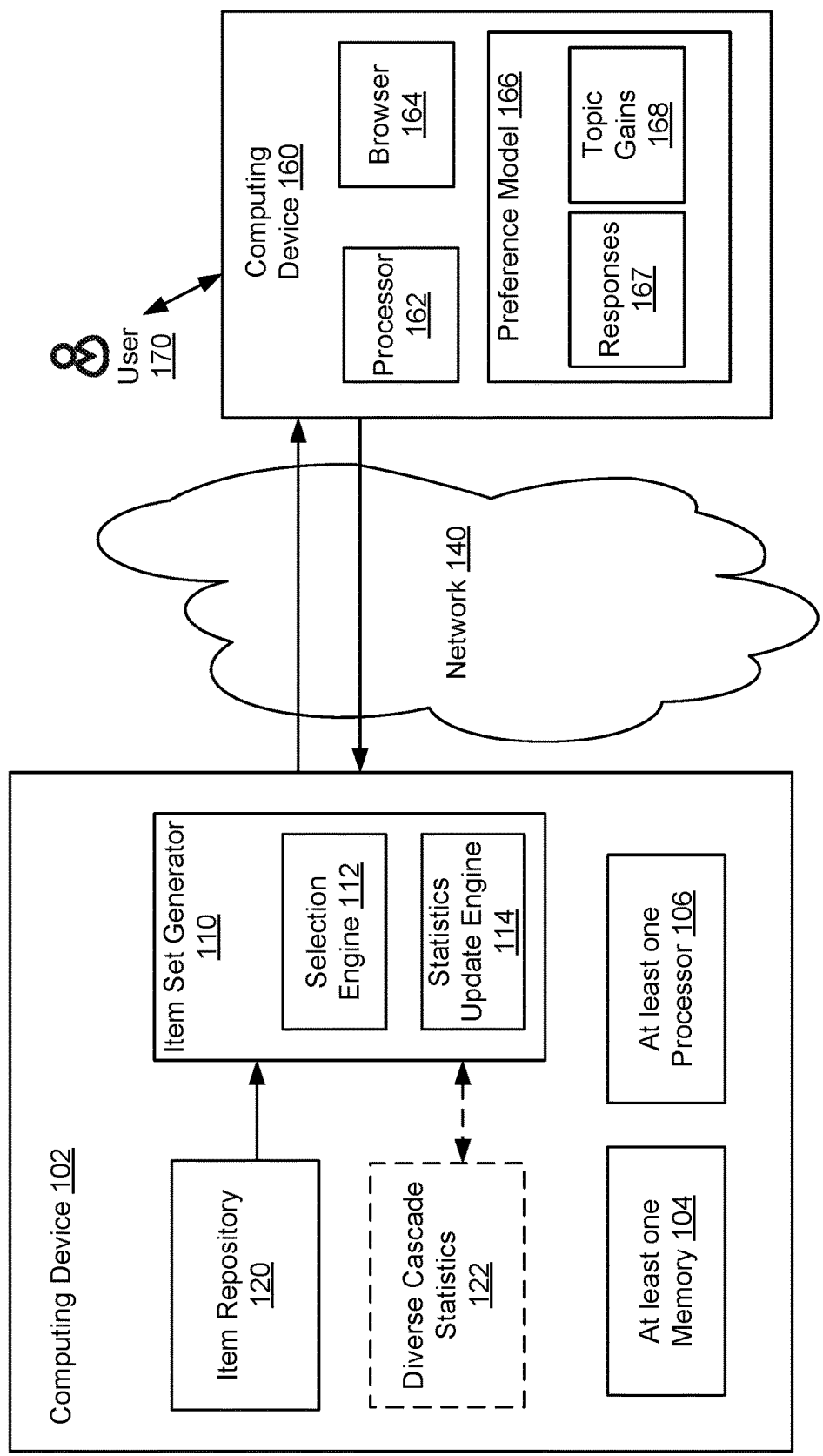
FIG. 1 is a block diagram of a machine learning recommendation system that uses a diverse cascade model, according to an implementation.

A novel machine learning recommendation system is disclosed for learning to rank diverse items for a single user from partial user feedback. In many recommendation systems, the items to be recommended can be associated, in different degrees, with one or more topics. Individual users also have affinity for (taste for/interest in) one or more of the topics. A diverse recommendation set includes items that reflect the user's interests. For example, when recommending movies, a diverse recommendation set includes movies representing multiple genres that the user is interested in. Diverse recommendations are important because such recommendations account for the different tastes of the user. For example, on a certain night the user may be more interested in science fiction movies and the next night a drama movie. A diverse list of recommended items includes at least one movie from each genre. However, in many cases the user's actual interests are not known ahead of time. Instead, the recommendation system must estimate the user's interests based on past interactions of the user with recommended items. Estimating the user's interests is also referred to as modeling the user's interests. At each interaction, the recommendation system learns more about the user's interests by making assumptions. Conventionally, characteristics of a recommended item that is selected by the user are assumed of interest to the user (i.e., favored) and characteristics of any other items in the recommendation are considered not of interest (i.e., disfavored). Recommendation systems keep statistics about the favored and disfavored characteristics and use these statistics to model, e.g., to estimate, the user's interests for generating a future recommendation set. Thus, over time, the recommendation system is said to learn a model of the user's preferences.

Such machine-learned approximations can be easily skewed by positional bias. For example, a recommendation system may provide a list of diverse items that tries to cover all of a user's tastes. But such a diverse list creates the real possibility that the user will not even look at items appearing lower in the list. That the user did not select an item appearing lower in the list does not necessarily mean the user does not find that item or the topics related to that item interesting. Machine-learned models that assume the user is not interested in the items appearing lower in the list may incorrectly learn not to recommend those items. This is positional bias. Conventional recommendation systems that model diversity (i.e., ensure that the recommendation set includes items representative of the user's varied interests) do not account for positional bias, meaning that the conventional recommendation system learns, mistakenly, not to recommend items appearing lower in the list.

The novel machine learning recommendation system accounts for positional bias while maximizing topic diversity. Disclosed recommendation systems generate a list of items ordered so that items associated with different topics of interest to the user appear near the top of the list. The recommendation system according to the disclosed implementations operates with the assumption that the user scans the list of items until the user is satisfied. Satisfaction is indicated by the user selecting, e.g., clicking on or tapping, an item in the list. The recommendation system according to the disclosed implementations operates on the assumption that topic(s) associated with the selected item are favored and the topic(s) associated with the items appearing ahead of the selected item are disfavored. Disclosed recommendation systems do not make assumptions about, i.e., learn from, items beyond the selected item. In other words, the recommendation system according to the disclosed implementations accounts for the positional bias by collecting statistical information of up to the selected item in each recommendation interaction round and then uses that statistical information to generate the future recommendation list. This eliminates positional bias because the characteristics (e.g., the topics associated with) items appearing lower in the list are not assumed to be disfavored. Accordingly, the recommendation system in accordance to the disclosed implementations does not mistakenly demote these characteristics. This provides an opportunity for items that appear lower in the list to eventually appear higher in the list, which increases the chances of receiving feedback (whether favorable or unfavorable) about that item. As demonstrated in FIGS. 5-8 below, this enables disclosed recommendation systems to converge on an optimal model, i.e., one that reflects the user's actual preferences, and do it in fewer processing cycles.

More specifically, the recommendation system according to disclosed implementation estimates the preference of a user based on statistics. The statistics are gathered through repeated interactions with the user. The statistics represent information about observed items. Observed items include any selected items and the items appearing ahead of the selected item in an ordered list of items. The statistics track the topic gains of these items. Topic gains are loosely defined as how different the topic association of an item is from the topic associations of all items appearing ahead of the item in the ordered list. A more precise definition of topic gain is provided below. As indicated above, a recommendation system according to disclosed implementations operates on the assumption that the user scans the ordered list until satisfied and only considers (observes) those items scanned. The topic gains of the items appearing ahead of the selected item are viewed as negative feedback and penalized, e.g., so that the system assumes the topics associated with the topic gains are not of interest to the user. The topic gain of the selected item is seen as positive feedback, e.g., so that the system assumes the topics associated with the topic gain of any selected item are of interest to the user.

At a next interaction, the system uses the feedback to re-estimate the user's preferences. The re-estimated preferences are used to generate another set of ordered items for presentation to the user. For example, the system identifies items with highest topic gain weighted by similarity with the user's preferences to determine the items in the ordered set, i.e., the recommendation set. Some recommendation systems according to disclosed implementations may include a rank bonus for items that represent topics the user has not yet provided feedback on, This is also referred to as an exploration bonus. The exploration bonus ensures that items that represent a topic without previous feedback are included in the recommended set. Without this bonus the system may never learn about all of a user's interests. The system then updates the statistics based on a selected item (or lack thereof) for the next interaction. In this manner the system iteratively collects statistics that, with each iteration, make the estimation of the preferences better, eventually converging on an optimal solution. The optimal solution correctly reflects the user's actual preferences. Thus, using the partial-click feedback statistics, the system learns the preferences of the user and uses those preferences to recommend an optimal set of items, e.g., items of interest to the user based on the preferences and representing multiple topics of interest to the user.

As used herein, a user refers to a single user or a group of users that share at least some common characteristic. A recommendation system according to disclosed implementations may therefore be used to generate personalized, diverse recommendations for one particular user or for any user that shares the common characteristic of a group of users.

As used herein, diversity is referred to in the context of topics. A topic is any categorization criteria that can be applied to an item. Non-limiting examples of topics include movie genres, music genres, restaurant types, store departments, colors, hobbies, brands, locales (e.g., state, country), etc. The topics are determined by valid characteristics of the items to be recommended. Items can be associated with more than one topic. For example, a movie may be considered both a comedy and science-fiction.

As used herein, items can be anything for which the system provides a recommendation. Non-limiting examples of items include books, music files, movies, clothing, food, restaurants, hotels, news articles, pictures, furniture, vacations, advertisements, groups, connections (e.g., a friend suggestion), etc. An item repository is any non-temporary computer storage that stores information about the items. Non-limiting examples of an item repository include a database, a spreadsheet, a file, a directory, etc. Items are associated with topics. For example, a movie may be associated with one of a number of topic genres, such as horror, science fiction, comedy, drama, animation, etc.

An ordered set of items may include one or more items. The set includes less than all items in an item repository. The ordered set has a predetermined size. The item that is selected first for inclusion in the set is considered the first item and is ahead of every other item that will be added to the set. An item selected next for inclusion in the set is considered ahead of every other item that will be added to the set, but is behind the first item, etc. The ordered set can also be referred to as a recommendation set, a list or an ordered list. The predetermined size of the set is much smaller than the total number of items in the item repository. An item in the ordered set of items is observed but unselected when the item appears ahead of a selected item in the ordered set of items, e.g., ahead of an item the user clicked on. If no item in that particular ordered set of items is selected by the user, all items in the ordered set are observed but unselected.

As used herein a vector is an array of numbers, where each position in the array represents a topic. Accordingly a vector has a length equal to the total number of different topics modeled by the system. The total number of different topics may be represented by d, where d is any number greater than 1. A preference vector is a vector where the value of each position in the array represents a user's interest in or affinity for the topic, where zero represents no interest or affinity for the topic. In some implementations the values may be floating-point numbers where a one (1) represents a highest or strongest level of affinity/interest. The preference vector may be represented as $\theta$. Individual positions within the vector, i.e., the individual topics, may be represented as $(\theta_1\ \theta_2\ \theta_d)$. A user's actual preference vector is represented as $\theta^* = (\theta_1^* \theta_2^* \ldots \theta_d^*)$. The actual preference vector is the optimal solution that the machine learning recommendation system is trying to model. The actual preference vector can also be referred to as ground truth. In evaluating the model, the quality of the recommendations made by the recommendation system is measured against this ground truth. In actual user (rather than evaluation), the recommendation system does not know the optimal solution. Therefore the recommendation system estimates the optional solution each time the user interacts with the recommendation system and seeks to improve the estimation with each interaction. This estimate is the preference vector and may be represented as $\bar{\theta} = (\bar{\theta}_1\ \bar{\theta}_2\ \bar{\theta}_d)$.

Similar to a preference vector, a topic vector is a vector where the value of each position in the array represents the strength of an item's association with the topic. Each item in an item repository has a topic vector. As with the preference vector, a value of zero at a particular position in the topic vector indicates the item has no association with the topic. In some implementations, the topic vectors are stored in the repository as an attribute of the item. In some implementations, the topic vectors may be calculated as needed.

When items are part of a set of items, the set has a topic coverage vector. Each entry in the topic coverage vector is associated with some monotone and submodular function such that the topic coverage of any set of items plus another item is greater than or equal to the topic coverage of the set of items alone and the gain in topic coverage of an item over a set of items is greater than or equal to the gain in topic coverage of the item over a superset of the set of items. In other words, where the monotone and submodular function is represented as c( ) the gain in topic coverage by an item e (i.e., any single item from the item repository) over a set of items S (any set of items from the item repository, including the empty set) is defined as $\Delta(e|S) = c(S+\{e\}) - c(S)$. Because all entries of c(S) and c({e}) are monotone and submodular, the gain in topic coverage, calculated from the topic coverage vector, can be represented by a vector defined as $[0,1]^{d \times 1}$. For ease of discussion, the gain in topic coverage, i.e., the vector defined as $[0,1]^{d \times 1}$ and calculated according to $c(S+\{e\}) - c(S)$ is also referred to as topic gain.

A preference model is a vector of preferences for a user. Because user preferences are not known ahead of time, implementations estimate a preference model based on user statistics. Herein, these statistics are referred to as diverse cascade statistics and are understood to be associated with a user, so that each user has respective diverse cascade statistics. The diverse cascade statistics store a history of interactions between the user and the item repository. In particular, the diverse cascade statistics store a history of past observed feature vectors and responses, one per observed item. An item is observed it if the item is selected by the user or appears ahead of a selected item in an ordered list of items. Any items appearing after a selected item are not observed items. The diverse cascade statistics include two components; previously observed topic gains and previously observed responses. Each previously observed response is information that indicates which items were observed for an interaction and, of those items observed, which item was selected (if any). In some implementations, the information about observed items may be stored for each interaction. In some implementations, the information in the observed responses may have an incremental structure. When stored in an incremental structure, the previously observed responses store the information in a manner that captures past interactions without significant growth of the data over time. For example, the information about observed items may represent the topic gain of the observed items over higher ranked items in the ordered set, i.e., $\Delta(e|S)$, weighted by whether the item was clicked or not. In other words, in some implementations, the previously observed responses may be topic gains of observed items weighted by their respective responses (i.e., clicked or not clicked). In some such implementations, the previously observed responses may be represented by a matrix. Implementations are not limited to those employing incremental structures and the observed responses may be represented in other ways, so long as the previously observed responses represents the history of which items were observed and which clicked, if any, during an interaction.

The previously observed topic gains of the diverse cascade statistics are feature vectors that represent the topic gain of an observed item e over higher ranked items in the ordered set i.e., $\Delta(e|S)$. Observed items are those items that appear ahead of the selected item in the recommendation list and the selected item. Thus, information for items that appear after the selected item is not used for learning and not included in the diverse cascade statistics. In some implementations, previously observed topic gains may be stored for each interaction. In some implementations, the previously observed topic gains may be stored using an incremental structure, e.g., to reduce processing time and storage requirements. In some such implementations the previously observed topic gains may be represented by a matrix. The matrix may represent the outer product of observed topic gains. The observed responses and the observed topic gains, together, represent the diverse cascade statistics. The system may use any data format to track the diverse cascade statistics, that enables the system to penalize topic gains of observed but un-clicked items and to promote the topic gain of a clicked item. In addition, the observed responses and the observed topic gains need not be stored in separate data structures.

Details of the systems and techniques are discussed below with respect to the illustrated figures. FIG. 1 is a block diagram of a machine learning recommendation system 100 that uses a diverse cascade model, according to an implementation. The system 100 includes a computing device 102 having at least one memory 104, at least one processor 106, and one or more modules, such as item set generator 110, selection engine 112, and statistics update engine 114. The computing device 102 may communicate with one or more other computing devices, e.g., computing device 160 over a network 140, e.g., the Internet or an intranet. The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform its various functions over a network 140.

The at least one processor 106 may represent two or more processors on the computing device 102 executing in parallel and utilizing corresponding instructions stored using the at least one memory 104. In some implementations, the at least one processor 106 may be a specialized processor, e.g. a graphics processing unit (GPU). The at least one memory 104 represents a non-transitory computer-readable storage medium. The at least one memory 104 may represent one or more different types of memory utilized by the computing device 102. In addition to storing instructions, which allow the at least one processor 106 to implement disclosed embodiments, the at least one memory 104 may be used to store data, such as one or more of the item repository 120 and the diverse cascade statistics 122. The at least one memory 104 may also be used to store processes and modules, such as item set generator 110, selection engine 112, and statistics update engine 114, etc., and their components.

The item set generator 110 may be configured to select a set of items from the item repository 120 to recommend to the user 170. The item set generator 110 uses a diverse cascade model to learn how to optimally personalize the recommendations for the user 170. The item set generator 110 may include a selection engine 112 and a statistics update engine 114. Although illustrated as part of the item set generator 110, the selection engine 112 and the statistics update engine 114 may each be separate from but accessible by the item set generator 110.

The item repository 120 stores information about a plurality of items. The items may be anything for which the system 100 provides a recommendation. Non-limiting examples of items are books, music, movies, products for purchase, restaurants, news articles, social communities, advertisements, social connections, etc. The item repository 120 may be a database or other repository for the items. Each item in the item repository 120 may be associated with one or more topics. A topic is any description or categorization criteria that can be applied to an item. Non-limiting examples of topics include movie genres, music genres, restaurant types, store departments, colors, hobbies, brands, locales (e.g., state, country), etc. Items can be associated with more than one topic. For example, a news article may be categorized as a sports article and a business article. As another example, a product may be associated with furniture and outdoors. The item repository 120 may store the topic(s) associated with an item as an attribute of the item. In some implementations, the item repository 120 may store a topic vector for each item. In some implementations, the system 100 may generate topic vectors as needed for each item from information stored in the item repository 120. The topic vector is an array where each position in the array represents one topic. If d (a positive non-zero integer) represents the total number of possible topics, then a topic vector has d positions, also referred to as d-dimensions. Thus, the topic vector may be referred to as a d-dimensional vector. Each position in the topic vector has a number that represents the strength of the association between the item and the topic.

Put another way, the higher the value of a position represents, the more strongly associated the item is with the topic. In some implementations the values are normalized, e.g., vary between zero and some upper-bound, such as one (1). The value may be calculated by an encoder using known techniques.

The item set generator 110 generates a personalized recommendation of some subset of items from the item repository 120 for a user 170. Each user 170 may receive a different recommendation. The subset of items from the item repository 120 is referred to as an ordered set, with the highest recommended item appearing first in the set. The item set generator 110 generates the ordered set using a diverse cascade model, which models both topic diversity and positional bias. Topic diversity is modeled using topic gain. The item set generator 110 calculates a topic gain for each item and for the ordered set of items as the set is generated. The topic gain is also a d-dimensional vector, but in the topic gain the value of the vector position is calculated by a monotone and submodular function, referred to herein as the coverage function. The coverage function is represented as $c(\{e\})$ where e represents one of the items in the item repository 120. The coverage function is any function that outputs vectors whose entries are monotone and submodular in the set of recommended items. The coverage function can generate a vector for a set having a single item, having no items, or having two or more items. The coverage function generates the topic gain such that if there is no association between the item (or subset of items) and the topic j, the coverage value $c_j$ is zero and if there is any association between the item(s) and the topic j, no matter what the strength of association, the coverage value $c_j$ is non-zero. In such implementations, the topic coverage $c(\{e\})$ may be expressed as $[0,1]^{d \times 1}$. The coverage function may be any function that satisfies the following:

$$\forall A \subseteq E, e \in E : c_j(A \cup \{e\}) \geq c_j(A),$$

$$\forall A \subseteq B \subseteq E, e \in E : c_j(A \cup \{e\}) - c_j(A) \geq c_j(B \cup \{e\}) - c_j(B),$$

where E represents the set of all items in the item repository 120 and j represents a topic, i.e., position j in the topic vector. Although the coverage function can be defined in many ways, one example coverage function is discussed below with regard to FIGS. 5-8.

The item set generator 110 estimates the preference vector for a user 170 each time an ordered subset of items is generated, i.e., each time the user 170 interacts with the item set generator 110. An interaction occurs when the item set generator 110 provides a set of items to the user 170 and receives feedback from the user 170 regarding the items. Like the topic vector, the preference vector is also a d-dimensional vector where each position represents one of d topics. The values in the preference vector represent the strength of association between the user and that topic. In some implementations, the values in the preference vector are normalized, so that each value is between zero and one (1) inclusive, although some other upper-bound may be used. The goal of the system 100 is to improve the estimated preference vector with each interaction with the user, thus the estimated preference vector is machine-learned using the disclosed techniques.

The item set generator 110 may include a selection engine 112. The selection engine 112 generates the estimate of the preference vector and uses the estimated preference vector and the coverage function in ranking the items in the item repository 120. The selection engine 112 generates a diverse set of items for the user 170, such that different topics are represented in the ordered set of items. The selection engine 112 determines which topics are represented in the ordered set of items based on the preference vector and topic gain, as represented by the coverage function. In other words, as explained in more detail with regard to FIGS. 3 and 4 below, items that add highest topic gain for topics the user is interested in appear higher in the ordered set. Put another way, the selection engine 112 uses the preference vector to build the ordered set of items so that items that are associated with topics the user prefers are considered first for the ordered set and added to the set based on topic gain in those topics. This means, for example, that when a user is interested in two topics, the selection engine 112 seeks to provide a list where an item associated with each of the two topics appears higher in the ordered set, giving the user 170 a top-ranked item for each topic.

The system 100 uses feedback from the user at each interaction to improve a future estimate of the preference vector. The feedback indicates either that the user 170 selected one of the items in the ordered set or that the user 170 failed to select any of the items in the ordered set. The item set generator 110 uses the feedback to update diverse cascade statistics used to estimate the preference model. In some implementations, the item set generator 110 may include a statistics update engine 114 that updates the diverse cascade statistics for a user based on the feedback. The diverse cascade statistics may be stored on a computer device 160 of the user 170, e.g., as diverse cascade statistics 166. In some implementations, the diverse cascade statistics may be stored, with user permission, at computing device 102, e.g., as diverse cascade statistics 122. In some implementations, diverse cascade statistics 122 is a copy of the diverse cascade statistics 166, stored with user permission. For ease of discussion, reference is made to diverse cascade statistics 166 only, but it is understood that the discussion of the structure, configuration, function of, and interactions with diverse cascade statistics 166 applies to diverse cascade statistics 122.

The diverse cascade statistics 166 includes a history of the interactions with the user 170, from which the item set generator 110 estimates the preference vector for user 170. The diverse cascade statistics 166 includes data about previously observed responses 167 and previously observed topic gains 168 for the user 170. The previously observed responses 167 are data that indicates, for each interaction with the user, which items were observed and not clicked and which item, if any, was clicked. The previously observed topic gains 168 for the user 170 are data that indicates, for each interaction with the user, characteristics of the items the user 170 observed. The topic gain represents what information the selected item added to the topic coverage of the items in the ordered set of items that appear ahead of the selected item. The topic gain can be represented as $\Delta(e|S)=c(S+\{e\})-c(S)$, where e is the item selected, S represents the items in the ordered set of items that appear ahead of e, and co) is the coverage function. The topic gain can be represented as a vector. Accordingly, topic gain is also understood to refer to a vector generated according to the representation above. In some implementations, the previously observed topic gains 168 and the previously observed responses 167 may have an incremental structure. The incremental structure may retain the historical data but in a manner that does not require the data to grow over time. For example, the previously observed responses 167 may be structured as a matrix of topic gains of observed items weighted by their respective responses (i.e., clicked or not clicked) and the previously observed topic gains may be structured as a matrix that represents the outer product of observed topic gains.

When an ordered set of items is provided for display to the user, the system 100 considers items observed when the items appear ahead of a selected item in the ordered set of items. In other words, the system 100 works off of an assumption that the user considers each item ahead of the selected item, but those items did not attract or interest the user, so the system 100 can learn from the characteristics of these observed, but unselected items. However, the user 170 may or may not have actually considered any items after the selected item. Thus, the system does not learn from characteristics of these items. If the user fails to select any of the items in the ordered set, all items are considered observed and unselected. The system 100 may store topic gains for these previously observed items and may penalize the topics represented by the topic gains 168. In other words, the system concludes that the user was not interested in the topics represented by the topic gains of observed but unselected items. Accordingly, the system records this information so that in the next estimate of the preference vector, the system downgrades the topic gains represented by the item over the higher-ranked items. Thus, as time progresses, the diverse cascade statistics 166 tracks both the topics the user is interested in, e.g., represented by topic gains of clicked items and the topics the user is likely not interested in, e.g., represented by topic gains of observed but un-clicked items. The statistics update engine 114 may update the diverse cascade statistics 166 after each interaction. For example, in some implementations the statistics update engine 114 may add a row or rows to a data store tracking the previously observed responses 167 and the previously observed gains 168 after receiving the feedback. As another example, the statistics update engine 114 may update an incremental structure with the data, e.g., by updating a topic gain matrix with an outer product of the observed topic gains and updating a response matrix by the observed topic gains weighted by respective responses (e.g., weighted by whether the item associated with the topic gain was selected or not). With each update of the diverse cascade statistics 166, the item set generator 110 learns how to better estimate the preferences of the user. The system thus employs a diverse cascade model to estimate the preferences of the user, which considers both position within an ordered set and topic gain of items.

The system 100 includes a computing device 160 having at least one processor 162 a memory storing modules and data, e.g., browser 164 and diverse cascade statistics 166. The memory may represent one or more different types of memory utilized by the computing device 160. The browser 164 may represent a conventional Internet browser or a specialized program for accessing item set generator 110. The computing device 160 may communicate with computing device 102 over network 140. The computing device 160 may be implemented as a server, a desktop computer, a laptop computer, a mobile device such as a tablet device or mobile phone device, as well as other types of computing devices. Although a single computing device 160 is illustrated, it is understood that several computing devices may be in communication with computing device 102 over one or more networks 140.

Figure 2:
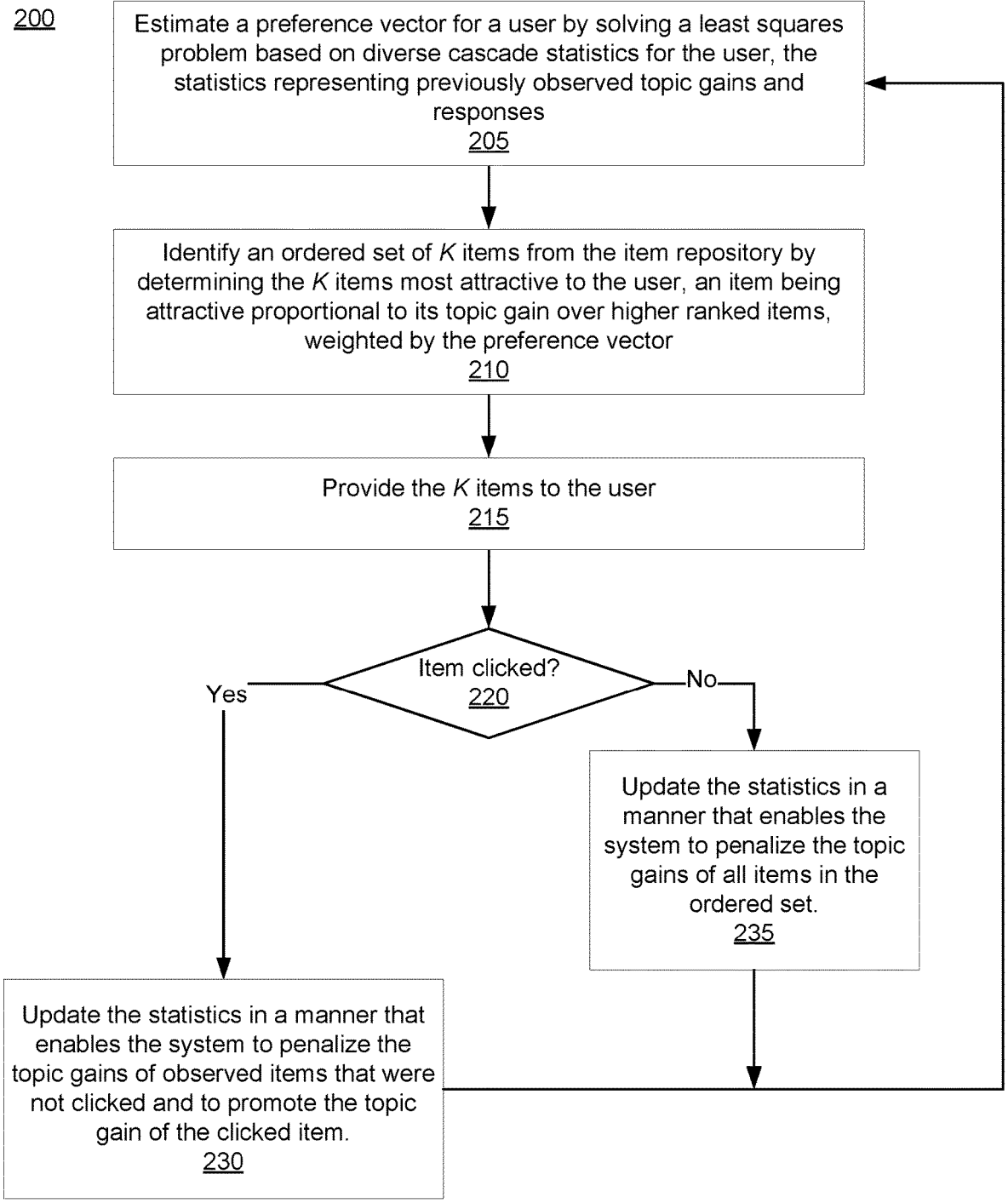
FIG. 2 is an example flowchart illustrating a process that uses a diverse cascade model for learning to provide optimal recommendations, according to an implementation.

FIG. 2 is an example flowchart illustrating a process 200 that uses a diverse cascade model for learning to provide optimal recommendations, according to an implementation. The process 200 may be performed by a system such as system 100 of FIG. 1. Process 200 is an iterative process.

Process 200 represents one interaction with the user, but it is understood that it is repeated each time the user interacts with the recommendation system. It is also understood that a system can perform process 200 concurrently for many different users. Process 200 uses diversity to generate a set of items for presentation to the user and partial-click feedback to update statistics used to estimate a model of the user, so that the recommendation improves over time to some optimal set for the user.

At the beginning of an interaction with the user, process 200 estimates a preference vector for the user using regression (205). Estimating the preference vector includes solving a least squares problem based on diverse cascade statistics for the user. The diverse cascade statistics represent previously observed topic gains and previously observed responses. Put another way, if $\bar{\theta}_{t-1}$ represents the estimated preference vector, the system takes all observed topic gains and responses up to the current interaction and finds the $\bar{\theta}_{t-1}$ that best fits $\{(\Delta(a_k^\ell | \{a_k^\ell \ldots a_{k-1}^\ell\}), 1\{k \leq C_\ell\}),\}_{\ell \in [t-1], k \in [C_\ell]}$ where $\ell$ represents a past interaction, a is an item in an ordered set of items previously provided to the user in the past interaction, and $C_\ell$ represents the item selected during the past interaction (e.g., from previously observed responses). One example of estimating the preference vector is illustrated at lines 6 to 8 of the pseudo code of FIG. 4. In the example of FIG. 4, the regression performed on the previously observed responses and previously observed topic gains penalizes the topic gains of unselected but observed items. Using the estimated preference vector, the system identifies an ordered set of K items (K being greater than zero) from the item repository (210). The system determines the K items most attractive to the user, where attractiveness is proportional to the items topic gain over higher ranked items already in the set weighted by the preference vector. The system also gives a bonus to some items for exploration. This process is explained in more detail with regard to FIG. 3.

Once the system determines the ordered set of items for recommendation to the user, the system provides the ordered set of items to the user (215). The user may view the items in an environment that enables the user to select one of the items, e.g., in a browser where the items are displayed as actionable links or icons, etc. The user provides feedback for the ordered set (220). The feedback indicates either that the user selected one of the items or that no items are selected. Examples of user actions that indicate no items are selected include the user selecting a control that causes the system to generate a new list, e.g., a "next page" control or a "new search control," the user leaving the user interface, e.g., closing the window or navigating to another web page. Any action the user takes after being presented with the ordered set that does not result in selection of an item is feedback that indicates no item is selected.

If an item is selected (220, Yes), the system updates the statistics in a manner that allows the system to penalize topic gains of observed items that were not clicked and to promote the topic gain of the clicked item (230). Observed items are those items appearing ahead of the clicked item in the ordered set. In some implementations, the system may update previously observed responses with information that indicates which items were observed and not selected and which item was the selected item. In some implementations, the system may update the previously observed responses with topic gains of observed items weighted by their responses. One example of updating the previously observed responses is illustrated in line 25 of lines 22 to 25 of the pseudo code in FIG. 4. The system also updates the topic gains of the statistics for the user for observed items, e.g., the clicked item and items that appear ahead of the clicked item. The system calculates the topic gain based on the topic coverage of the items in the ordered set of items that appear ahead of the selected item and the topic coverage of the selected item. The topic coverage is a d-dimensional vector where each entry represents a topic and has a value that represents a strength of coverage for the topic and is generated by a coverage function. The gain in topic coverage is defined as $\Delta(e|S)=c(S+\{e\})-c(S)$, where e is the item selected and S represents the items in the ordered set of items that appear ahead of the selected item e. The coverage function c( ) is any function that outputs vectors whose entries are monotone and submodular in the set of recommended items. One example of a coverage function is $1-(\Pi_{e \in S}(1-\bar{w}(e,1)), \ldots \Pi_{e \in S}(1-\bar{w}(e,d)))$ where $\bar{w}(e,j) \in [0,1]$ is the attractiveness of item e in the topic j and 1 is a d-dimensional vector of ones. Implementations may use other coverage functions.

By updating the statistics, e.g., the observed responses and the observed topic gains, the system is able to penalize the topic gains of observed but not clicked items and promote the topic gain of the clicked item. Promotion may be done by not penalizing the topic gains. In some implementations, the system updates the previously observed topic gains by iteratively going through the items in the ordered list of items and down-weighting the topic gain represented by each item over higher ranked items if the item is not clicked. The topic gain of a clicked item is promoted, e.g., either not down-weighted or up-weighted. The system updates only the topic gains of the observed items. Thus, the system updates the diverse cascade statistics based on partial click feedback, e.g., does not learn from any items that occur after the clicked in the ordered set. As one example update, the system may pair the topic gain of an observed item with an indicator of whether the item was selected or not and store the pair in a data store. For example, if the topic gain of an observed item is x1, the system may store (x1, 0) if the item was not selected and (x1, 1) if the item is selected. The system may, during estimation of the preference vector penalize or promote the topic vectors according to the indication, e.g., penalizing the topic vector if the indication is '0'. In implementations, the system may use an incremental implementation, where the previously observed topic gains and the previously observed responses are updated at each interaction in a manner that summarizes the data before storing it, as illustrated in lines 20 to 25 of the pseudo code of FIG. 4. In the example of FIG. 4, the previously observed responses (e.g., B) are updated by the observed topic gains weighted by whether the corresponding observed item was clicked or not and the previously observed topic gains ($M_t$) are updated with the outer product of the observed topic gains. FIG. 4 illustrates one example implementation and implementations are not limited to the example illustrated in FIG. 4. Once the statistics are updated, the system is ready to re-estimate the preference vector and generate a new list, e.g., to repeat process 200.

If the feedback indicates no item is selected (220, No), the system updates the statistics for all items in the ordered set (235). The system updates the previously observed topic gains with the topic gains of all items in the ordered set and updates the previously observed responses to indicate that no item was selected in a manner similar to that described above with regard to step 230.

Once the system updates the diverse cascade statistics, e.g., previously observed responses and previously observed topic gains, the system is ready to start another interaction with the user, i.e., another iteration of process 200. The updated statistics are used in the estimate of the preference vector (205). In some implementations, process 200 is run for a maximum number of interactions with the user, i.e., a maximum number of steps n.

Figure 3:
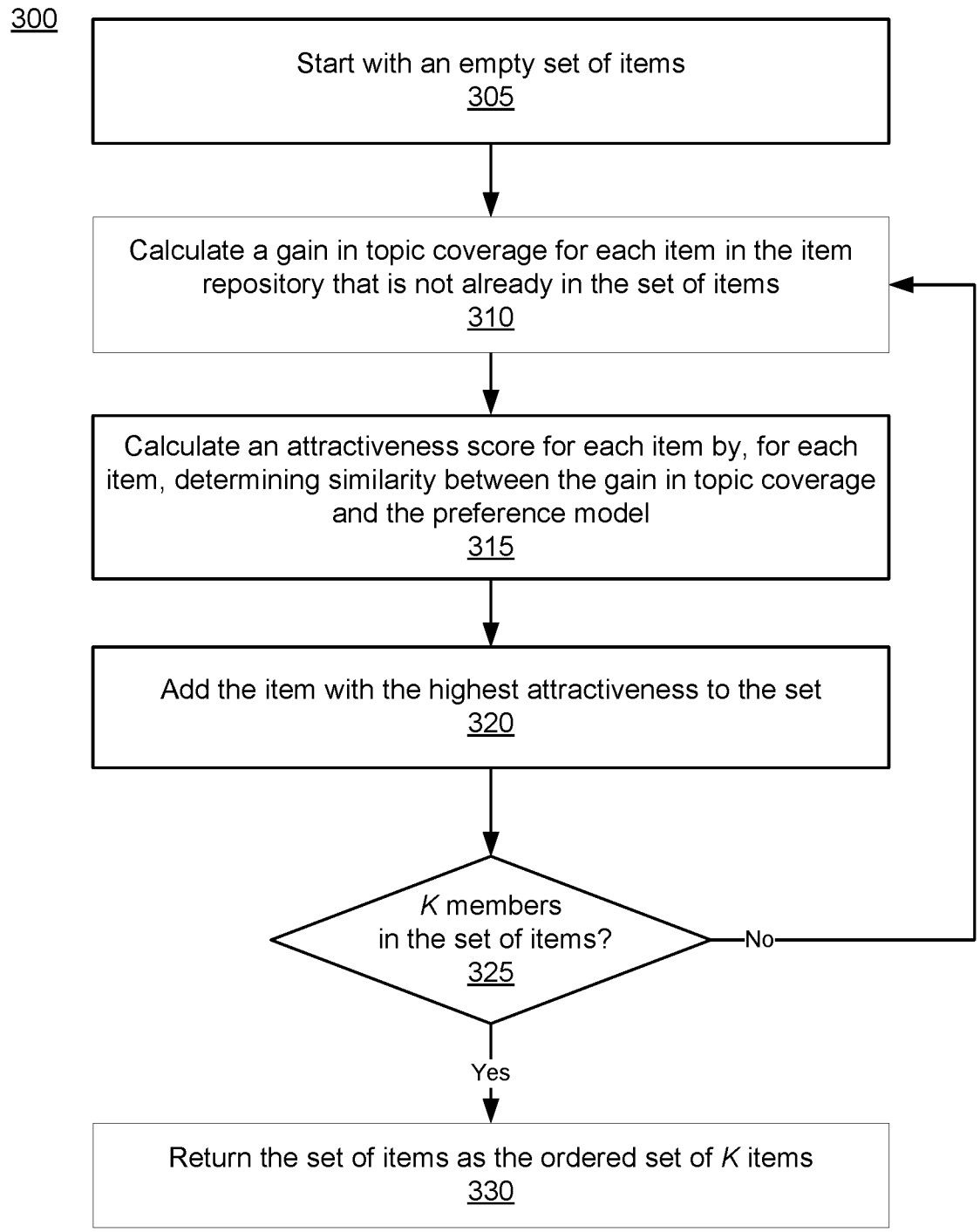
FIG. 3 is an example flowchart illustrating a process for generating an ordered set of recommended items, according to an implementation.

FIG. 3 is an example flowchart illustrating a process for generating an ordered set of recommended items, according to an implementation. Process 300 may be performed as part of step 210 of FIG. 2. Process 300 is also represented by lines 11 to 17 of the pseudo code of FIG. 4. Process 300 generates an ordered set of items for the user to be used as a recommendation. The ordered set generated by process 300 models diversity, so that the ordered set of items includes items that represent different interests of the user. Process 300 begins with an empty set (305). This is because process 300 is an iterative process that evaluates the entire item repository at each iteration to identify the item with the highest gain in topic coverage in topics that the user has interest in. The system calculates a topic gain for each item in the item repository that is not already in the set (310). The gain in topic coverage is determined by the topic vector for the item and a coverage function and can be represented by $x_e \leftarrow \Delta(e|S)$ where S represents the ordered set of items, e is the item not already in S and $\Delta(e|S)$ is the gain in topic coverage calculated by coverage function c( ) such that $\Delta(e|S)=c(S+\{e\})-c(S)$. The system finds the item with the highest gain in topic coverage weighted by the preference vector of the user with a bonus for exploration of topics (315). This is represented by line 15 of the pseudo code of FIG. 4. The bonus for exploration is represented by $\alpha \sqrt{x_e^T M_{t-1}^{-1} x_e}$ in FIG. 4. The system then adds this item to the ordered set of items (320). The system repeats steps 310 to 320 (325, No) until the ordered set of items has K members (325, Yes). Process 300 then ends.

FIG. 4 is an example of pseudo code illustrating a process that uses a diverse cascade model for learning to provide optimal recommendations, according to an implementation. FIG. 4 is an example of an incremental implementation. In the pseudo code of FIG. 4, the input is a variance parameter $\sigma^2$. This parameter is also called the learning rate. The other parameter is a constant represented by $\alpha$. This constant controls the degree of optimism and has a value greater than zero. If the system has never interacted with the user before, e.g., t=0, the matrix that represents the previously observed topic gains M and the matrix that represents the previously observed responses B are initialized at lines 3 and 4. The previously observed topic gains are initialized to an identity matrix and the previously observed responses is initialized to zeros. Steps 7 to 25 represent iterations of process 200 of FIG. 2. In the pseudo code n represents the maximum number of interactions that the system has with a user. This maximum number may be fixed or may be infinite. As one example, in the experiments of FIGS. 5-8, n is set at 200 k. Lines 10 to 17 represent step 210 of FIG. 2 and process 300 of FIG. 3. Line 18 represents receiving the feedback from the user. The feedback will indicate one of the K items as selected or indicate no item is selected, e.g., represented as infinity. Lines 20 to 25 are examples of updating the diverse cascade statistics, as described above with regard to steps 230 to 250 of FIG. 2. The time complexity of each iteration of the pseudo code is $\mathcal{O}(d^3+KLd^2)$, the update of the statistics (e.g., lines 20-25) takes $\mathcal{O}(Kd^2)$ time, and the space complexity is $\mathcal{O}(d^2)$.

FIGS. 5-8 are graphs illustrating the benefits of a diverse cascade model over conventional models in varying recommendation environments. The graphs all compare four methods of recommendation. CascadeLSB employs the methods of disclosed implementations. In other words, CascadeLSB uses a diverse cascade model and demonstrates the benefits of disclosed implementations. LSBGreedy (e.g., described by Yue and Guestrin in 2011) represents methods that use a diverse model that does not consider partial click feedback. In other words, the LSBGreedy method does not account for positional bias and assumes feedback about all items in the ordered set regardless of position within the ordered set. CascadeLinUCB (e.g., Zong et al. in 2016), represents a cascading bandit method with linear generalization across recommended items, but CascadeLinUCB does not model interactions due to higher recommended items, i.e., diversity. In the examples of FIGS. 5-8 the feature vector of an item e in the CascadeLinUCB model is set to $\Delta(e|\emptyset)$ because it does not model topics. Finally, CascadeKL-UCB (Keeton et al. 2015) is a cascading bandit that learns the attraction probability of each item independently and does not model diversity. In the examples of FIGS. 5-8 the coverage function is $1-(\Pi_{e \in S}(1-\bar{w}(e,1)), \ldots \Pi_{e \in S}(1-d)))$ where $\bar{w}(e,i) \in [0,1]$ is the attractiveness of an item e in the topic i and 1 is a d-dimensional vector of ones. The learning rate parameter, i.e., $\sigma^2$, in CascadeLSB, LSBGreedy, and CascadeLinUCB is set to 0.1.

Figure 5:
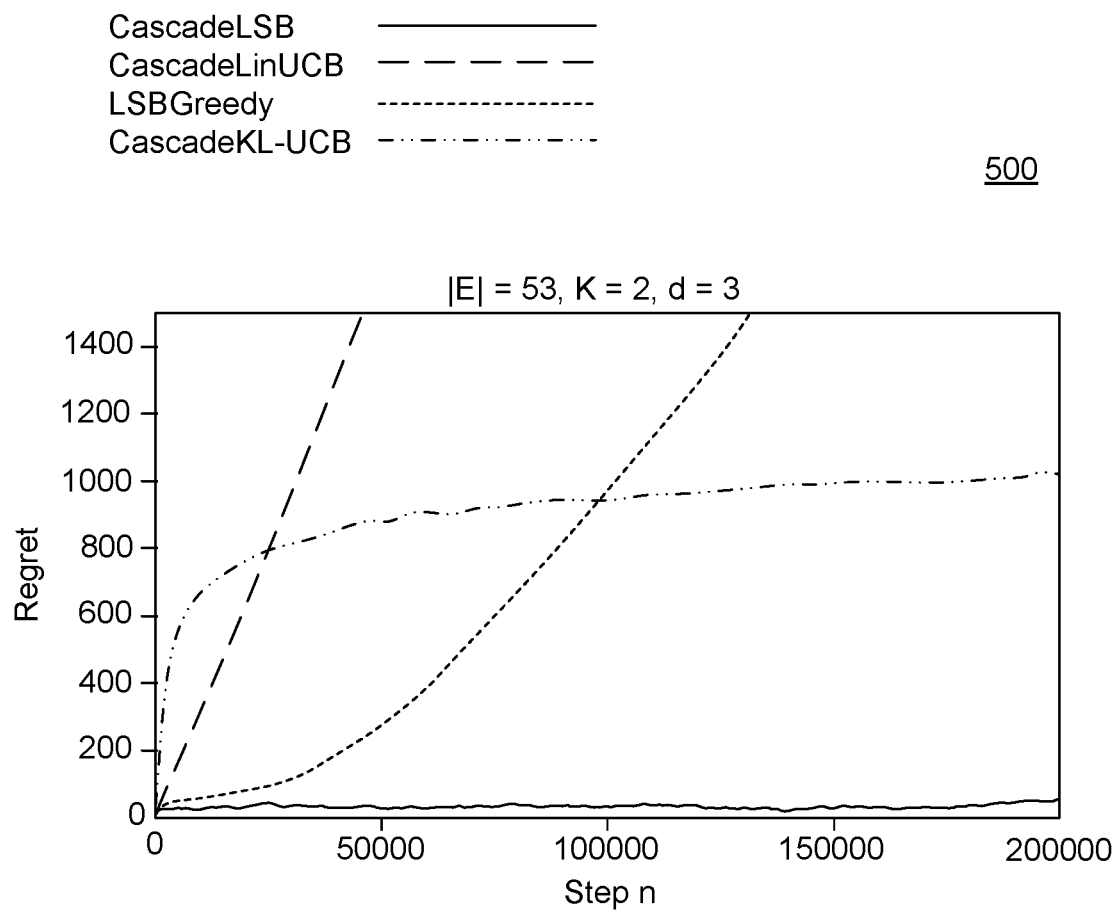

The graph 500 of FIG. 5 represents a synthetic experiment that illustrates the benefit for modeling both diversity and partial click feedback, i.e., positional bias, in a machine-learning recommendation system, such as system 100 of FIG. 1. In the example of FIG. 5 the set of items includes 53 items, each associated with one or more of three topics. Thus, E=[53] and d=[3]. The system of FIG. 5 generates an ordered set of two (2) items out of the 53 possible items, so K=2. In the synthetic experiment, items 1 and 2 are associated with topic 1 with a strength of 0.5 and all other items have no association with topic 1; item 3 has an association with topic 2 with a strength of 0.5 and all other items have no association with topic 2. The simulated user's actual preference vector $\theta^*$ is (0.6, 0.4, 0.0). In other words, the user has an interest in topics 1 and 2, but not in topic 3, and is slightly more interested in topic 1 than topic 2. The goal of the experiment is to generate a diverse list of two items from the 53 that captures this preference, e.g., where items associated with topic 1 appears first and an item associated with topic 2 appears next. In other words, the optimal recommendation is (item 1, item 3), as items 1 and 2 are not diverse. In the example of graph 500, the number of interactions concluded after 200 k steps and averaged over 100 randomly initialized runs. The graph 500 plots the cumulative regret at each step (interaction). The regret is the sum of all lost clicks with respect to the optimal solution, so the lower the regret the better.

Graph 500 illustrates that CascadeLSB flattens and does not increase as the number of steps, i.e., interactions, increases. This means CascadeLSB converges to the optimal solution, i.e., learns to recommend the optimal solution. In contrast, the regret of LSBGreedy grows linearly with the number of steps, which means LSBGreedy never converges on the optimal solution. Rather, LSBGreedy constantly fluctuates between two solutions (1, 2) and (1, 3). The regret of CascadeLinUCB is also linear because it converges to solution (1, 2), which fails to model diversity. CascadeKL-UCB does eventually converge on the optimal solution, but with an order of magnitude higher regret than CascadeLSB. Thus, graph 500 illustrates that disclosed implementations achieve the desired result in much fewer processing (e.g., CPU) cycles, which improves the performance of the recommendation system over prior methods.

FIGS. 6-8 illustrate evaluations of disclosed implementations and other ranking methods on real item repositories. FIG. 6 illustrates three graphs comparing the performance of the four methods in a simulation using movie recommendations. The repository of items in the example of FIG. 6 is a collection of metadata about movies, including user ratings and movie genres. In the example of FIG. 6, 1000 most rated movies were extracted and 1000 most rating users were extracted. The movies in the repository are associated with one or more of 18 genres, i.e., topics. Thus, in the example of FIGS. 6, E=[1000] and d=18. The example of FIG. 6 assumes that a user i is attracted to movie j if the user rated that movie with 5 stars. Because each movie is associated with one or more genres, an actual user preference vector can be generated. Graph 605 illustrates cumulative regret with an ordered set of four items, graph 610 illustrates cumulative regret with an ordered set of eight items, and graph 615 illustrates cumulative regret with an ordered set of twelve items. As illustrated, CascadeLSB outperforms all other prior methods, with lower regret overall and performs better when the number of items in the recommendation set, i.e., the size of the ordered set of items, grows.

FIG. 7 illustrates three graphs comparing the performance of the four methods in a simulation using song recommendations. The repository of items in the example of FIG. 7 is a collection of audio features and metadata for songs, including user downloads and ratings. In the example of FIG. 7, 1000 most popular songs were extracted, so E=[1000]. In the example of FIG. 7, data from 1000 of the most active users was also extracted, as measured by number of song-listening events. In the example of FIG. 7, topics are the song genres and there were 40 song genres possible the sample of 1000 songs. In the example of FIG. 7, the system considered the user attracted to a song if the user listened to the song at least 5 times. Using this measurement and the association between songs and genres, the system can generate an optimal preference vector and an optimal recommendation set, from which to gauge regret. In the example of FIG. 7 each ordered set of items had eight members (K=8). Graph 705 illustrates the regret of each method when the number of genres is 10. Graph 710 illustrates the regret of each method when the number of genres is 20, and graph 715 illustrates the regret when the number of genres is 40. As illustrated in FIG. 7, CascadeLSB has the lowest regret, illustrating that disclosed methods are robust to the choice of topics.

FIG. 8 illustrates three graphs comparing the performance of the four methods in a simulation using restaurant recommendations. The repository of items in the example of FIG. 8 is a collection of restaurant reviews for 48 k restaurants in more than 600 categories. In the example of FIG. 8, 1000 most reviewed restaurants were extracted, so E=[1000]. In the example of FIG. 8, data from 1000 of the most active users was also extracted, as measured by number of reviews. In the example of FIG. 8, topics are the restaurant categories and a total of 10 categories were modeled, so d=10. In the example of FIG. 8, the system considered the user attracted to a restaurant if the user gave the restaurant at least 4 stars. Using this measurement and the association between restaurants and restaurant categories, the system can generate an optimal preference vector and an optimal recommendation set, from which to gauge regret. Graph 805 illustrates the regret of each method when the number of items in the ordered set is four. Graph 810 illustrates the regret of each method when the number of items in the ordered set is eight, and graph 815 illustrates the regret when the number of items in the ordered set is twelve. FIG. 8 illustrates that implementations perform as well as other methods when the attraction probabilities are small. In the Yelp Challenge dataset, the attraction probabilities are small because items do not cover any topic properly, making the gain in topic coverage is negligible. Thus, FIG. 8 illustrates that disclosed implementations are robust even when diversity cannot be well represented.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit). Method steps may also be performed in a different order than illustrated in the figures.

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

According to one general aspect a computer-implemented method includes estimating a preference vector for a user based on stored diverse cascade statistics for the user, the diverse cascade statistics being based on previous interactions of the user with items in an item repository, the diverse cascade statistics including previously observed responses and previously observed topic gains. The method also includes generating an ordered set of items from the item repository, the items in the ordered set having highest topic gain weighted by similarity with the preference vector, providing the ordered set for presentation to the user, and receiving feedback from the user on the ordered set, the feedback indicating either a selected item or no item selected. The method also includes, responsive to the feedback indicating a selected item, updating the diverse cascade statistics for observed items, observed items being the selected item and items appearing ahead of the selected item in the ordered set, wherein the updating results in penalizing the topic gain for an item of the observed items that is not the selected item and promoting the topic gain for the selected item and, responsive to the feedback indicating no item selected, updating the diverse cascade statistics for all items in the ordered set of items, wherein the updating results in topic gains of all items being penalized.

These and other aspects can include one or more of the following features. For example, the method may be performed iteratively, and the previously observed responses may be stored in a matrix and the previously observed topic gains are stored in a matrix. As another example, estimating the preference vector includes using linear regression that includes a learning rate parameter. As another example, the observed topic gains for the user may be represented in a first matrix that represents the outer product of observed topic gains and wherein the observed responses for the user may be represented in a second matrix that represents the observed topic gains weighted by whether an item was clicked. As another example, the user may be a group of users sharing a common characteristic. As another example, generating the preference vector may include finding the preference vector that best fits $\{(\Delta(a_k^\ell | \{a_1^\ell \ldots a_{k-1}^\ell\}), 1\{(\leq C_\ell\})\}_{\ell \in [t-1], k \in [C_\ell]}$ where: $\ell$ represents each previous interaction with the user, $C\ell$ represents the selected item at interaction $\ell$, a represents items in the ordered set of items provided to the user during interaction $\ell$, and $\Delta(a_k^\ell | \{a_1^\ell \ldots a_{k-1}^\ell\})$ is the topic gain of the kth observed item during interaction $\ell$.

As another example, the item repository may store, for each item, a d-dimensional item topic vector, where each position in the item topic vector represents a topic and has a value that represents a strength of coverage for the topic. As another example, the ordered set of items has K items, K being greater than zero, and identifying the ordered set of items may include initializing the ordered set to an empty set and iterating K times: calculating a topic gain for each item in the item repository that is not already in the set of items, identifying an item from the item repository with a highest attractiveness score, the attractiveness score for an item representing a similarity between the topic gain and the preference vector with a bonus for exploration, and adding the item with the highest attractiveness to the ordered set. In some such implementations, identifying the item with a highest topic gain weighted by the preference vector may be represented as arg max $[x_e^T \bar{\theta}_{t-1} + \alpha \sqrt{x_e^T M_{t-1}^{-1} x_e}]$, where $M_{t-1}$ represents the previous observed topic gains from the diverse cascade statistics, e represents one of the items not already in the ordered set, $x_e$ represents the topic coverage of the item e over the items already in the set, a is a parameter controlling the bonus for exploration, and $\bar{\theta}_{t-1}$ is the estimated preference vector.

In one aspect, a computer system includes at least one processor, memory storing diverse cascade statistics of a user, the diverse cascade statistics representing previously observed topic gains for the user and previously observed responses for the user, and memory storing instructions that, when executed by the at least one processor, causes the computer system to perform operations. The operations include generating, using the at least one processor, a preference vector for the user by solving a least squares problem using the previously observed topic gains and responses for the user, identifying an ordered set of items from an item repository that maximizes topic gain within the ordered set weighted by the preference vector, and receiving feedback on the ordered set of items, the feedback indicating either a selected item or no selection. Responsive to the feedback indicating a selected item the operations include updating the previously observed topic gains with topic gains of the selected item and items appearing ahead of the selected item in the ordered set and updating the previously observed responses to indicate the items appearing ahead of the selected item were not selected and the selected item was selected. Responsive to the feedback indicating no selection the operations include updating the previously observed topic gains with topic gains of each item in the ordered set and the previously observed responses to indicate no items were selected.

These and other aspects can include one or more of the following features. For example, updating the previously observed topic gains includes calculating an outer product of the observed topic gains. As another example, the observed topic gains for the user may be represented in a first matrix that represents the outer product of observed topic gains and the observed responses for the user may be represented in a second matrix that represents the observed topic gains weighted by whether an item was selected. As another example, updating the previously observed responses may include weighting observed topic gains by a weight, the weight being dependent on whether the item was clicked or un-clicked. As another example, generating the preference vector includes finding the preference vector that best is represented by $\{(\Delta(a_k^\ell | \{a_1^\ell \ldots a_{k-1}^\ell\}), 1\{k \le C_\ell\})\}_{\ell \in [t-1], k \in [C_\ell]}$ where $\ell$ represents each previous interaction with the user, $C_\ell$ represents the selected item at interaction $\ell$, a represents items in the ordered set of items provided to the user at interaction $\ell$, and $\Delta(a_k^\ell | \{a_1^\ell \ldots a_{k-1}^\ell\})$ is the topic gain of the kth observed item at interaction $\ell$.

As another example, the operations may also include, responsive to determining that the memory lacks diverse cascade statistics for the user, initializing the diverse cascade statistics by setting a matrix representing the previous observed responses to zero and setting a matrix representing the previously observed topic gains to an identity matrix. As another example, the ordered set of items has K items, K being greater than zero, and identifying the ordered set of items can include initializing the ordered set to an empty set and iterating K times: from among items in the item repository that are not already in the ordered set, identifying the item with a highest topic gain weighted by the preference vector, and adding the item with the highest topic gain weighted by the preference vector to the ordered set. As another example, the item repository stores, for each item, a d-dimensional item topic vector, where each position in the item topic vector represents a topic and has a value that represents a strength of coverage for the topic.

In one aspect, a computer-implemented method comprises iteratively learning a preference vector for a user, the preference vector used to select a set of diverse items from an item repository for the user, the iterative learning being based on partial-click feedback. In the method, each iteration includes estimating a current preference vector using a linear regression of diverse cascade statistics determined in prior iterations, wherein each entry in the vector corresponds to one of d topics and a value of the entry represents strength of association between the user and the topic that corresponds to the entry, generating an ordered set of items for a user from an item repository, the item repository storing, for each item, a topic vector where each entry in the topic vector corresponds to one of the d topics and a value of the entry represents strength of association between the item and the topic that corresponds to the entry, the ordered set of items maximizing topic coverage weighted by the current preference vector, wherein the topic coverage of an item is a difference vector representing differences between the topic vector of the item and the combined topic vectors of items already selected for the ordered set, providing the ordered set of items for presentation to the user, receiving a feedback from the user for the ordered set, the feedback indicating either a selected item from the ordered set of items or no item selected, and updating the diverse cascade statistics responsive to the feedback. The method includes, responsive to the feedback indicating no item selected, updating the diverse cascade statistics to penalize the topic gain for each item in the ordered set, each item being an observed item. The method also includes, responsive to the feedback indicating a selected item, updating the diverse cascade statistics to penalize, for each item appearing ahead of the selected item in the ordered set, the topic gain for the item and updating the diverse cascade statistics with the topic gain of the selected item. In the method, the selected item is an observed item and each item appearing ahead of the selected item in the ordered set is an observed item.

These and other aspects can include one or more of the following features. For example, generating the order of the ordered set of items may be a function of topic gain for topics with higher values in the current preference vector. In some implementations, the function is represented by arg max $[x_e^\tau \bar{\theta}_{t-1} + \alpha \sqrt{x_e^\tau M_{t-1}^{-1} x_e}]$, where $M_{t-1}$ represents the prior topic gains from the previous iterations, $\alpha$ is a parameter constant, e represents one of the items not already in the ordered set, $x_e$ represents the topic coverage of the item e over the items already in the set, and $\bar{\theta}_{t-1}$ is the current preference vector. As another example, updating the diverse cascade statistics is represented by, for each observed item e in current iteration t, $M_t \leftarrow M_t + \sigma^{-2} x_e x_e^\tau$ and $B_t \leftarrow B_t + x_e 1\{C_t = e\}$, where $\sigma^{-2}$ is a variance parameter greater than zero, e represents the observed item, $x_e$ represents the topic coverage of the item e over the items appearing ahead of e in the ordered set, $C_t$ is the selected item for this iteration t, $M_t$ is a matrix of prior topic gains, and $B_t$ is a matrix of prior responses.

According to one general aspect, a system includes at least one processor and memory storing instructions that, when executed by the at least one processor, cause the system to perform any of the operations or methods disclosed herein.

What is claimed is:

1. A computer-implemented method comprising:
   using machine learning to estimate a preference vector for a user based on stored diverse cascade statistics for the user, the diverse cascade statistics being based on previous interactions of the user with items in an item repository, the diverse cascade statistics including previously observed responses and previously observed topic gains,
   wherein estimating the preference vector includes penalizing topic gain for an observed but unselected item and promoting topic gain for a selected item, observed items appearing before selected items in the previous interactions;
   generating, by at least one processor, an ordered set of items from the item repository, the items in the ordered set having a highest topic gain weighted by similarity with the preference vector; and
   providing, by the at least one processor, the ordered set for presentation to the user.

2. The method of claim 1, wherein the preference vector is a first preference vector and the method further comprises:
   receiving, by the at least one processor, feedback from the user on the ordered set, the feedback indicating either a selected item or no item selected;
   responsive to the feedback indicating a selected item:
     updating, by the at least one processor, the diverse cascade statistics for observed items, observed items being the selected item and items appearing ahead of the selected item in the ordered set,
     wherein the updating results in penalizing the topic gain for an item of the observed items that is not the selected item and promoting the topic gain for the selected item;
   responsive to the feedback indicating no item selected, updating, by the at least one processor, the diverse cascade statistics for all items in the ordered set of items, wherein the updating results in topic gains of all items being penalized; and
   estimating, by at least one processor, a second preference vector for the user using the updated diverse cascade statistics.

3. The method of claim 1, wherein estimating the preference vector includes using linear regression that includes a learning rate parameter.

4. The method of claim 1, wherein the observed topic gains for the user are represented in a first matrix that represents an outer product of observed topic gains and wherein the observed responses for the user is represented in a second matrix that represents the observed topic gains weighted by whether an item was selected.

5. The method of claim 1, wherein generating the preference vector includes finding the preference vector that best fits $$\{(\Delta(a_k^\ell|\{a_1^\ell \ldots a_{k-1}^\ell\}), 1\{k \le C_\ell\})\}_{\ell \in [t-1], k \in [C_\ell]} \text{ where:}$$

$\ell$ represents each previous interaction with the user, $C_\ell$ represents the selected item at interaction $\ell$, a represents items in the ordered set of items provided to the user during interaction $\ell$, and $\Delta(a_k^\ell|\{a_1^\ell \ldots a_{k-1}^\ell\})$ is the topic gain of the $k^{th}$ observed item during interaction $\ell$.

6. The method of claim 1, wherein the ordered set of items has K items, K being greater than zero, and identifying the ordered set of items includes:
initializing the ordered set to an empty set; and
iterating K times:
calculating a topic gain for each item in the item repository that is not already in the set of items,
identifying an item from the item repository with a highest attractiveness score, the attractiveness score for an item representing a similarity between the topic gain and the preference vector with a bonus for exploration, and
adding the item with the highest attractiveness to the ordered set.

7. The method of claim 6, wherein identifying the item with a highest topic gain weighted by the preference vector is represented as $$\arg\max[x_e^\top \bar{\theta}_{t-1} + \alpha\sqrt{x_e^\top M_{t-1}^{-1} x_e}], \text{ where:}$$

$M_{t-1}$ represents the previous observed topic gains from the diverse cascade statistics, e represents one of the items not already in the ordered set, $x_e$ represents the topic coverage of the item e over the items already in the set, $\alpha$ is a parameter controlling the bonus for exploration, and $\bar{\theta}_{t-1}$ is the preference vector.

8. The method of claim 1, wherein the item repository stores, for each item, a d-dimensional item topic vector, where each position in the item topic vector represents a topic and has a value that represents a strength of coverage for the topic.

9. A computer system comprising:
at least one processor;
memory storing diverse cascade statistics of a user, the diverse cascade statistics representing previously observed topic gains for the user and previously observed responses for the user; and
memory storing instructions that, when executed by the at least one processor, causes the computer system to perform operations including:
using machine learning to estimate a preference vector for the user from the previously observed topic gains and responses for the user, identifying an ordered set of items from an item repository that maximizes topic gain within the ordered set weighted by the preference vector;
receiving feedback on the ordered set of items, the feedback indicating either a selected item or no selection;
responsive to the feedback indicating a selected item:
updating the previously observed topic gains with topic gains of the selected item and items appearing before the selected item in the ordered set, and
updating the previously observed responses to indicate the items appearing before the selected item were not selected and the selected item was selected; and
responsive to the feedback indicating no selection, updating the previously observed topic gains with topic gains of each item in the ordered set and the previously observed responses to indicate no items were selected.

10. The system of claim 9, wherein updating the previously observed topic gains includes calculating an outer product of the observed topic gains.

11. The system of claim 9, wherein the observed topic gains for the user are represented in a first matrix that represents an outer product of observed topic gains and the observed responses for the user are represented in a second matrix that represents the observed topic gains weighted by whether an item was selected.

12. The system of claim 9, wherein updating the previously observed responses includes weighting observed topic gains by a weight, the weight being dependent on whether the item was selected or not selected.

13. The system of claim 9, wherein generating the preference vector includes finding the preference vector that best is represented by $$\{(\Delta(a_k^\ell|\{a_1^\ell \ldots a_{k-1}^\ell\}), 1\{k \le C_\ell\})\}_{\ell \in [t-1], k \in [C_\ell]} \text{ where:}$$

$\ell$ represents each previous interaction with the user, $C_\ell$ represents the selected item at interaction $\ell$, a represents items in the ordered set of items provided to the user at interaction $\ell$, and $\Delta(a_k^\ell|\{a_1^\ell \ldots a_{k-1}^\ell\})$ is the topic gain of the $k^{th}$ observed item at interaction $\ell$.

14. The system of claim 9, wherein the operations also include, responsive to determining that the memory lacks diverse cascade statistics for the user, initializing the diverse cascade statistics by setting a matrix representing the previous observed responses to zero and setting a matrix representing the previously observed topic gains to an identity matrix.

15. The system of claim 9, wherein the ordered set of items has K items, K being greater than zero, and identifying the ordered set of items includes:
initializing the ordered set to an empty set; and
iterating K times:
from among items in the item repository that are not already in the ordered set, identifying the item with a highest topic gain weighted by the preference vector, and
adding the item with the highest topic gain weighted by the preference vector to the ordered set.

16. The system of claim 9, wherein the item repository stores, for each item, a d-dimensional item topic vector, where each position in the item topic vector represents a topic and has a value that represents a strength of coverage for the topic.

17. A computer-implemented method comprising:
generating, by at least one processor, an ordered set of items for a user from an item repository, the item repository storing, for each item, a topic vector where each entry in the topic vector corresponds to one of a plurality of topics and a value of the entry represents strength of association between the item and the topic that corresponds to the entry, the ordered set of items maximizing topic coverage weighted by a current preference vector, wherein the topic coverage of an item is a difference vector representing differences between the topic vector of the item and the combined topic vectors of items already selected for the ordered set, and wherein machine learning is used to estimate the current preference vector based on a linear regression of diverse cascade statistics determined in at least one prior iteration;

providing, by the at least one processor, the ordered set of items for presentation to the user;

receiving a feedback from the user for the ordered set, the feedback indicating either a selected item from the ordered set of items or no item selected;

responsive to the feedback indicating no item selected: updating, by the at least one processor, the diverse cascade statistics to penalize a respective topic gain for each item in the ordered set, each item being an observed item;

responsive to the feedback indicating a selected item: updating, by the at least one processor, the diverse cascade statistics to penalize, for each item appearing before the selected item in the ordered set, the respective topic gain for the item, and updating, by the at least one processor, the diverse cascade statistics with the topic gain of the selected item, wherein the selected item is an observed item and each item appearing ahead of the selected item in the ordered set is an observed item; and using machine learning to estimate a next current preference vector based on a linear regression of the updated diverse cascade statistics.

18. The method of claim 17, wherein generating the order of the ordered set of items is a function of topic gain for topics with higher values in the current preference vector.

19. The method of claim 18, wherein the function is represented by:

$$\arg\max[x_e^\tau \bar{\theta}_{t-1} + \alpha\sqrt{x_e^\tau M_{t-1}^{-1} x_e}], \text{ where:}$$

$M_{t-1}$ represents prior topic gains from previous iterations,
$\alpha$ is a parameter constant,
e represents one of the items not already in the ordered set,
$x_e$ represents the topic coverage of the item e over the items already in the set, and
$\bar{\theta}_{t-1}$ is the current preference vector.

20. The method of claim 17, wherein updating the diverse cascade statistics is represented by, for each observed item e in current iteration t, $M_t \leftarrow M_t + \sigma^{-2} x_e x_e^\tau$ and $B_t \leftarrow B_t + x_e 1\{C_t = e\}$ where:
$\sigma^{-2}$ is a variance parameter greater than zero,
e represents the observed item,
$x_e$ represents the topic coverage of the item e over the items appearing ahead of e in the ordered set,
$C_t$ is the selected item for this iteration t,
$M_t$ is a matrix of prior topic gains, and
$B_t$ is a matrix of prior responses.

* * * * *